(12) United States Patent
Tadano et al.

(10) Patent No.: US 6,448,945 B1
(45) Date of Patent: *Sep. 10, 2002

(54) VERTICAL PIN DISTORTION CORRECTION APPARATUS AND METHOD FOR A MULTI-SCAN DISPLAY

(75) Inventors: Taro Tadano; Pablo Espinosa; Tadashi Fujise, all of San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/695,123

(22) Filed: Oct. 23, 2000

Related U.S. Application Data

(63) Continuation of application No. 09/079,658, filed on May 15, 1998, now Pat. No. 6,208,320.

(51) Int. Cl.[7] ................................................. G09G 1/06
(52) U.S. Cl. .......................................... 345/10; 345/13
(58) Field of Search ............................... 345/10, 11, 12, 345/13, 14, 15, 16, 17, 18, 19, 20, 22, 23, 24, 25, 26, 27, 28, 29; 315/371, 370, 386, 391, 399

(56) References Cited

U.S. PATENT DOCUMENTS

| | | |
|---|---|---|
| 4,588,929 A | 5/1986 | Wedam et al. |
| 4,677,350 A | 6/1987 | Wharton et al. |
| 4,737,692 A | 4/1988 | Okuyama et al. |
| 4,764,709 A | 8/1988 | Oliver |
| 4,916,365 A | 4/1990 | Arai |
| 5,079,486 A | 1/1992 | Honda et al. |
| 5,389,859 A | 2/1995 | Stessen et al. |
| 5,420,484 A | 5/1995 | Morrish |
| RE35,183 E | 3/1996 | Ose et al. |
| 5,686,800 A | 11/1997 | Kim |
| 5,712,532 A | 1/1998 | Ogino et al. |

*Primary Examiner*—Xiao Wu
(74) *Attorney, Agent, or Firm*—Blakely, Sokoloff, Taylor & Zafman LLP

(57) ABSTRACT

An apparatus and method for providing image correction for a multifrequency display system. The apparatus comprises a circuit that generates a first signal based on a correction signal, a horizontal synchronization signal and a vertical synchronization signal. The apparatus also comprises a deflection circuit that generates a deflection signal based on the first signal and the vertical synchronization signal. The deflection circuit is operable within a range of frequencies. A video processing circuit coupled to the deflection circuit, and receives a video input signal and the deflection signal. The video processing circuit generates an output video signal based on the deflection signal and the video input signal.

16 Claims, 5 Drawing Sheets

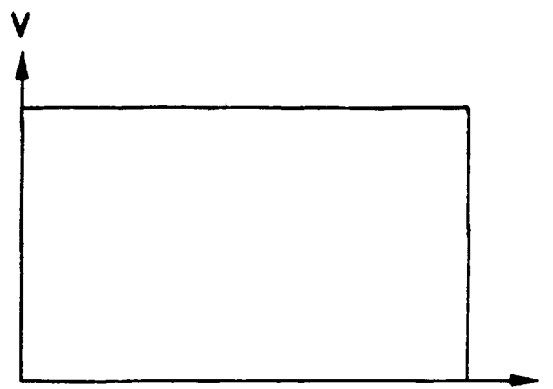
FIG. 1A — IDEAL IMAGE
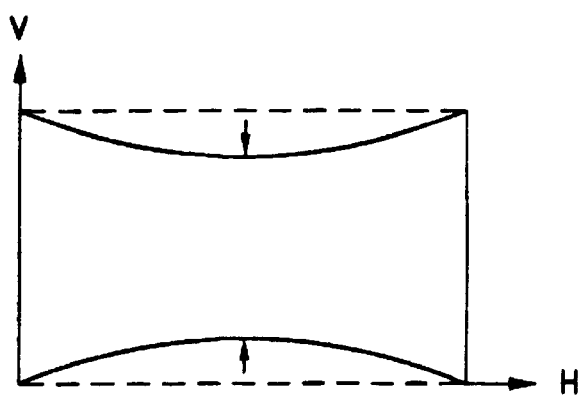
FIG. 1B — DISTORTED IMAGE DUE TO VERTICAL DEFLECTION
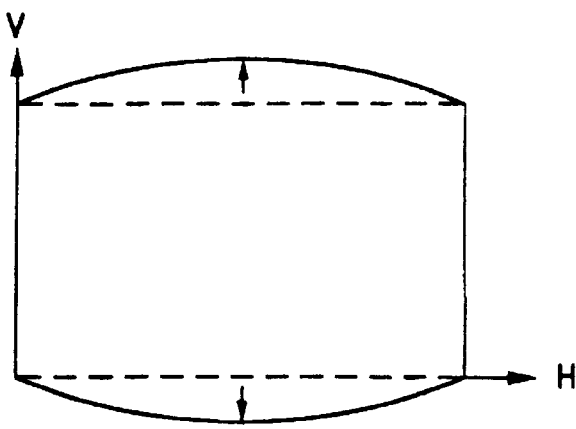
FIG. 1C — DISTORTED IMAGE DUE TO VERTICAL DEFLECTION
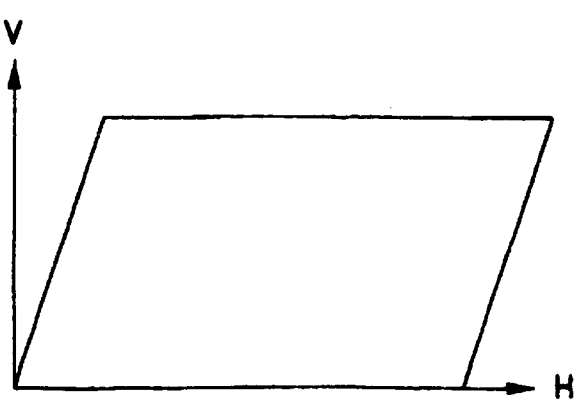
FIG. 1D — DISTORTED IMAGE DUE TO KEYSTONE DISTORTION

DISTORTED IMAGE DUE TO HORIZONTAL DEFLECTION

DISTORTED IMAGE DUE TO HORIZONTAL DEFLECTION

VERTICAL PIN DISTORTION CORRECTION APPARATUS AND METHOD FOR A MULTI-SCAN DISPLAY

CROSS-REFERENCE TO RELATED APPLICATIONS

This application is a continuation of and claims the priority of application Ser. No. 09/079,658, filed May 15, 1998, now U.S. Pat. No. 6,208,320 entitled VERTICAL PIN DISTORTION CORRECTION APPARATUS AND METHOD FOR A MULTI-SCAN DISPLAY, which is assigned to the same assignee of the present application.

BACKGROUND OF THE INVENTION

1. Field of the Invention

The present invention relates in general to display systems, and in particular, to a method and apparatus for providing image distortion correction for a multiscan display.

2. Description of the Related Art

Cathode ray tubes ("CRT") are typically employed in electronic display systems, such as a television receiver or a display apparatus including a CRT a numerical display. Each color CRT consists of three electron guns (a red, a white and a blue electron gun) and a phosphor screen that is located inside an evacuated glass envelope. Each electron gun generates a beam of electrons that is accelerated towards the screen by a positive anode voltage. An image is formed on the screen according to the density of the projected electron beam. The electron beam is also deflected by the electron magnetic field formed by the deflection coil so that the deflection angle of the electron beam may be deformed if the electromagnetic field is altered due to imperfections in the deflection yoke, misalignment and/or misadjustment of the deflection yoke.

Such imperfections, misalignment and or misadjustment of the deflection yoke typically results in providing a distorted image, as shown in FIGS. 1B, 1C, 1D, 1E, and/or 1F instead of providing the desired image shown in FIG. 1A.

Imperfections in the image due to horizontal deflection appear on the left and right sides of the image resulting in non-rectangularity of the images (e.g. due to Keystone distortion—see FIG. 1D, or due to horizontal pin distortion,—see FIGS. 1E and 1F etc.). These are corrected by adding a vertical frequency component to the horizontal deflection current and therefore varying the deflection current angle at the top, middle and bottom portions of the screen. This type of correction is currently used in most display monitors, including multi-scan and single-scan monitors. To correct for imperfections at the top and bottom sides of the screen, manual adjustment of the deflection yoke is commonly used. Sometimes, a magnetic field (e.g. a static magnet) can be added in the vertical deflection circuit. This will change the angle of the vertical deflection current at the left, middle and right sides of the screen. This technique has been used successfully in single-scan monitors, which are typically used in convention television sets. Unfortunately, the technique provides image distortion correction over a very narrow range of frequencies, and therefore, cannot be implemented in multi-scan monitors.

Accordingly, there is a need in the technology for method and apparatus for providing image distortion correction for a multi-scan display.

BRIEF SUMMARY OF THE INVENTION

An apparatus and method for providing image correction for a multi-frequency display system. The apparatus comprises a circuit that generates a first signal based on a correction signal, a horizontal synchronization signal and a vertical synchronization signal. The apparatus also comprises a deflection circuit that generates a deflection signal based on the first signal and the vertical synchronization signal. The deflection circuit is operable within a range of frequencies. A video processing circuit coupled to the deflection circuit, and receives a video input signal and the deflection signal. The video processing circuit generates an output video signal based on the deflection signal and the video input signal.

BRIEF DESCRIPTION OF THE DRAWINGS

FIG. 1A illustrates a display image under ideal conditions.

FIG. 1B illustrates a distorted display image having non parallel, concave top and bottom sides.

FIG. 1C illustrates a distorted display image having non parallel, convex top and bottom sides.

FIG. 1D illustrates a distorted display image having non-vertical sides.

DETAILED DESCRIPTION OF THE INVENTION

Figure 1E:
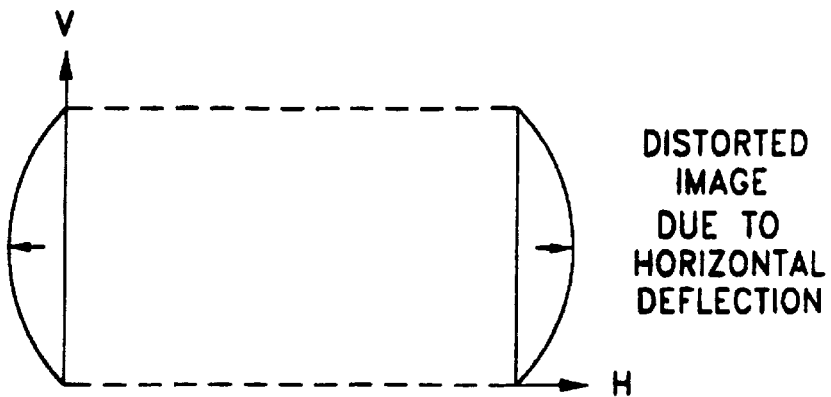
FIG. 1E illustrates a distorted display image having non-parallel, convex left and right sides.
Figure 1F:
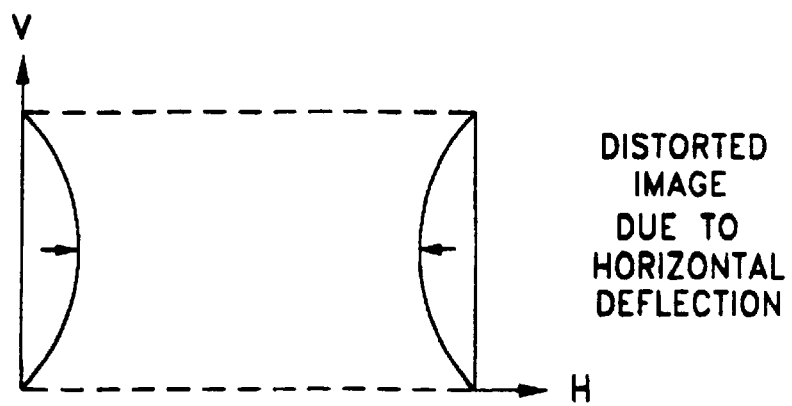
FIG. 1F illustrates a distorted display image having a non-parallel, concave and left and right sides.
Figure 2:
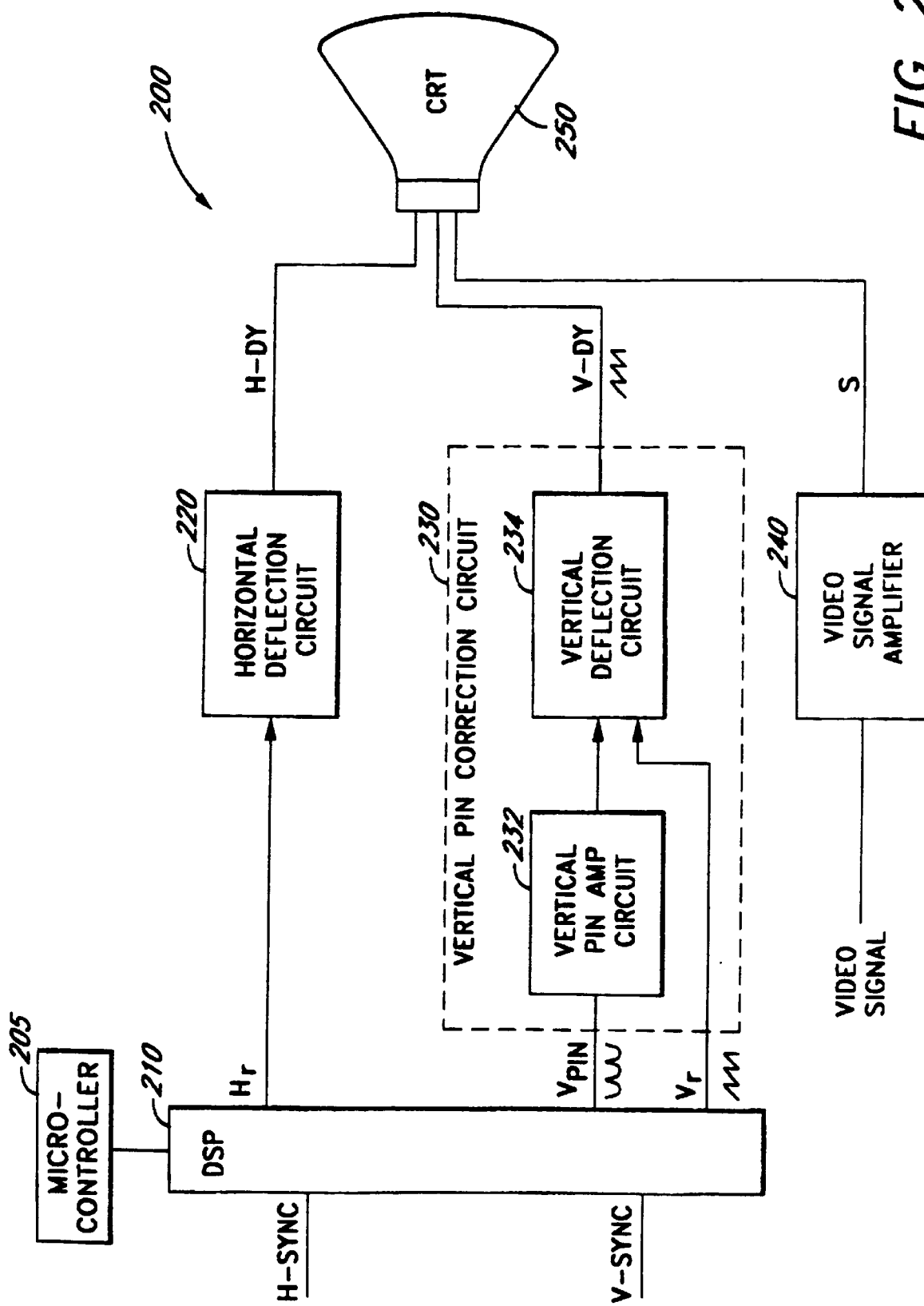
FIG. 2 is a block diagram illustrating a video display system 200 which implements one embodiment of the image distortion correction circuit of the present invention.

FIG. 2 is a block diagram illustrating a video display system 200 which implements one embodiment of the image distortion correction circuit of the present invention. The video display system 200 comprises a controller circuit 205 which receives and stores correction data for correcting image distortion and a digital signal processor (DSP) 210, which receives a horizontal synchronization signal H-Sync, and a vertical synchronization signal V-Sync. In one embodiment, the controller circuit 205 stores the correction data based on adjustment information obtained during the manufacturing process of the video display system 200. The controller circuit 205 generates a controller output signal based on the correction signal and provides the output signal to the DSP 210. The DSP 210 generates a horizontal output signal Hr in response to the H-Sync signal, and a vertical output signal Vr in response to the H-Sync and V-Sync signals. The horizontal output signal Hr is used to generate a signal which horizontally deflects a video signal, while the vertical output signal Vr is used to generate a signal which vertically deflects the video signal, so that the resulting image on the screen of the display is properly positioned.

The DSP 210 also generates a $V_{PIN}$ signal based on the V-Sync, H-Sync and controller output signals. The wave form of the $V_{PIN}$ signal is typically hyperbolic, and is used to correct or adjust the vertical deflection signal Vr. The $V_{PIN}$ and Vr signals are provided to a vertical pin correction circuit 230. In one embodiment, the vertical pin correction circuit 230 which comprises a vertical pin amplification circuit 232, that operates in conjunction with a vertical deflection circuit 234, to provide image distortion correction of a display image along the y-axis of the image, for a multi-scan display monitor, as discussed in detail in the following sections. In particular, the $V_{PIN}$ signal is provided to a vertical pin amplification sign circuit 232, while the Hr and Vr signals are provided to a horizontal deflection circuit 220 and a vertical deflection circuit 234 respectively.

Based on the Hr signal, the horizontal deflection circuit 220 generates a horizontal deflection signal H-DY. Likewise, the vertical deflection circuit 234 generates a vertical deflection signal V-DY based on the $V_{PIN}$ and $V_R$ signals. The signals H-DY and V-DY are provided to a cathode ray tube (CRT) 250. In one embodiment, the CRT 250 is a multi-frequency scanning display monitor. In addition, as shown in FIG. 2, a video signal, is amplified by a video signal amplifier 240, and then provided to the CRT 250. The signals H-DY and V-DY are respectively used to properly deflect the amplified video signal S, so that the resulting image displayed on the CRT 250 is properly positioned. In addition, since the V-DY signal has been corrected using the technique of the present invention, image distortion can be reduced or eliminated.

Figure 3A:
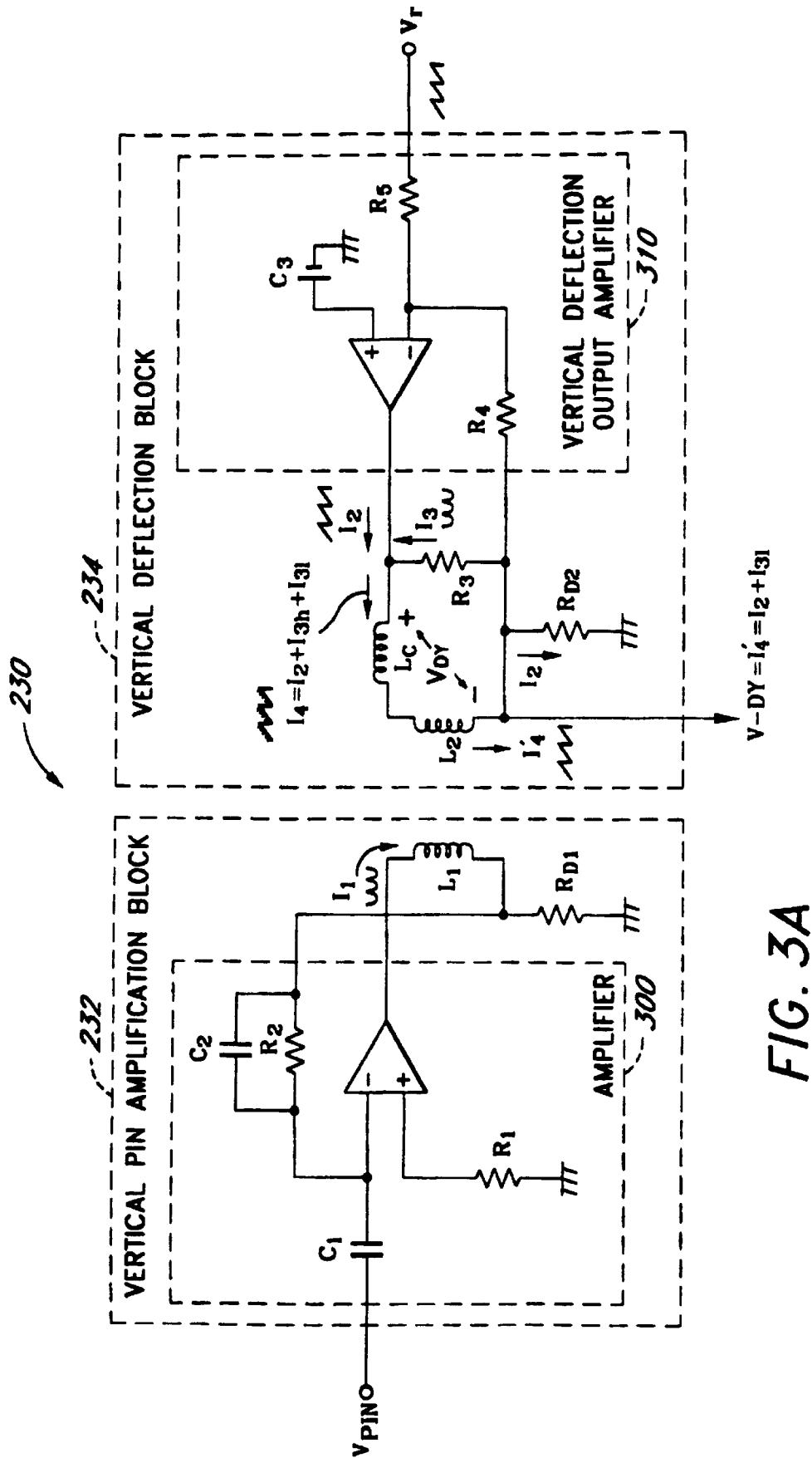
FIG. 3A is a detailed block diagram of one embodiment of the vertical pin correction circuit of FIG. 2.

FIG. 3A is a detailed block diagram of one embodiment of the vertical pin correction circuit 230 of FIG. 2. The vertical pin amplification block 232 comprises an amplifier 300 which receives the signal $V_{PIN}$, and an inductor L1 that is coupled to the output of the amplifier 300 at one end. The other end of the inductor L1 is coupled to a resistor $R_{D1}$ and to an input of the amplifier 300. The other end of the resistor $R_{D1}$ is grounded. The capacitors C1, C2 and resistors R1 and R2 are implemented in the amplifier 300 for signal conditioning purposes. In one embodiment, the amplifier 300 is a high speed amplifier. The signal $V_{PIN}$ is hyperbolic, and includes a horizontal frequency component $V_{PIN}h$ and a vertical scan (or low) frequency component $V_{PIN}l$.

The vertical deflection block 234 comprises an inductor L2 that is connected in series with a second inductor Lc. In one embodiment, Lc is a high frequency filter. One end of the L2-Lc inductor combination is coupled to one input of a vertical deflection output amplifier 310 while the other end of the L2-Lc inductor combination is coupled to a resistor $R_{D2}$ and to a second input of the vertical deflection output amplifier 310. The other end of the resistor $R_{D2}$ is grounded. The L2-Lc inductor combination is also connected in parallel with a damping resistor R3. A capacitor C3 and resistors R4 and R5 are included in the vertical deflection output amplifier 310 for signal conditioning purposes. Typical values of the inductor include: L1≈100 mH; L2≈3 mH and Lc≈700 mH.

In operation, the signal $V_{PIN}$ is amplified by the amplifier 300, to provide a current I1, which comprises a high frequency component I1h and a low frequency component I2l, i.e., I1=I1h+I1l. The signal Vr, which typically has a ramp waveform and has only a low frequency component Vrl, is provided as one input to the vertical deflection output amplifier 310. The vertical deflection output amplifier 310 generates an output current I2, which also has a ramp waveform and has only a low frequency component, I2l. The current I1 in the vertical pin amplifier block 232 induces a magnetic field in the inductor L2 in the vertical deflection block 234, which subsequently induces a current I3 through the inductor L2. The current I3 also comprises a high frequency component I2h and a low frequency component I2l, i.e., I3=I3h+I3l. Thus, at the node A, I4=I2+I3=I2l+I3h+I3l. By placing the inductor Lc in series with the inductor L2, the high frequency component I3h is decoupled from the vertical deflection block 234, so that the resulting output signal V-DY=I4'=I2l+I3l, of the vertical deflection output amplifier 310, only has a low frequency component. In this manner, the vertical output amplifier 310 will not attempt to compensate for the high frequency component in I3 and the resulting output signal (V-DY) only has a low frequency component.

Figure 3B:
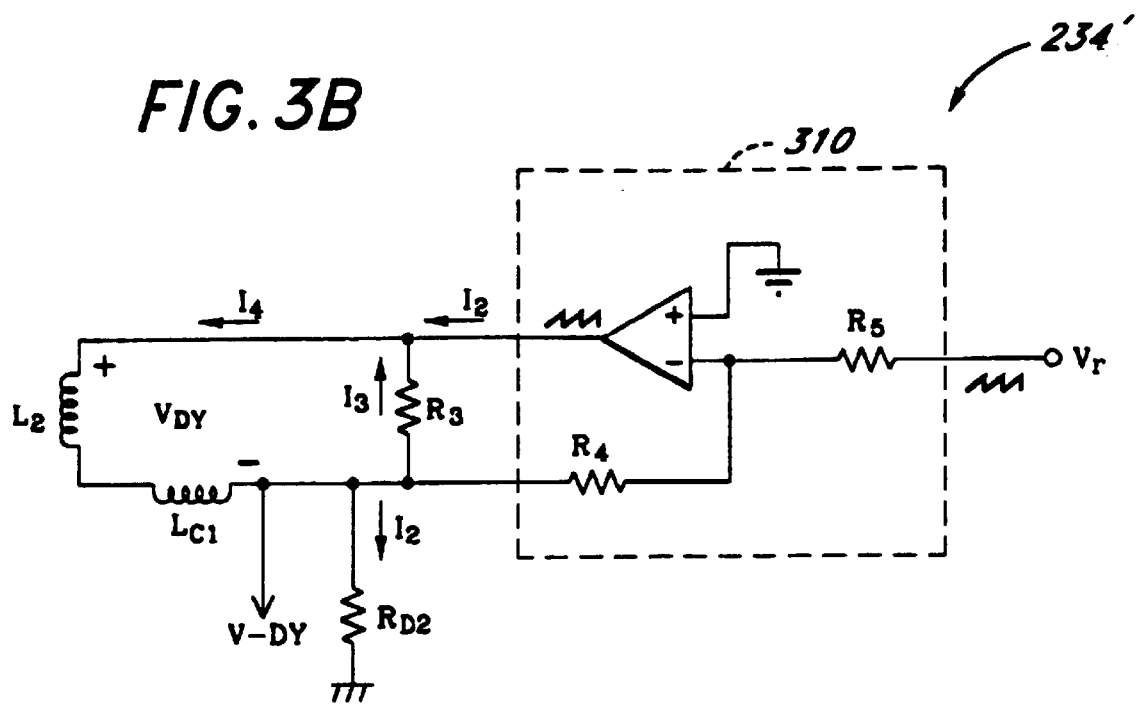
FIG. 3B illustrates a schematic diagram of an alternate embodiment of the vertical deflection block 234 of FIG. 3A.

FIG. 3B illustrates a schematic diagram of an alternate embodiment 234' of the vertical deflection block 234 of FIG. 3A. In both FIGS. 3A and 3B, the inductor Lc is connected in series with the inductor L2. However, in FIG. 3A, the inductor Lc is coupled at one end to a damping resistor R3 and to the output of the vertical deflection output amplifier 310, while in the embodiment of FIG. 3B, the inductor Lc is coupled at one end to the damping resistor R3 and to one end of the resistor RD2.

Figure 4:
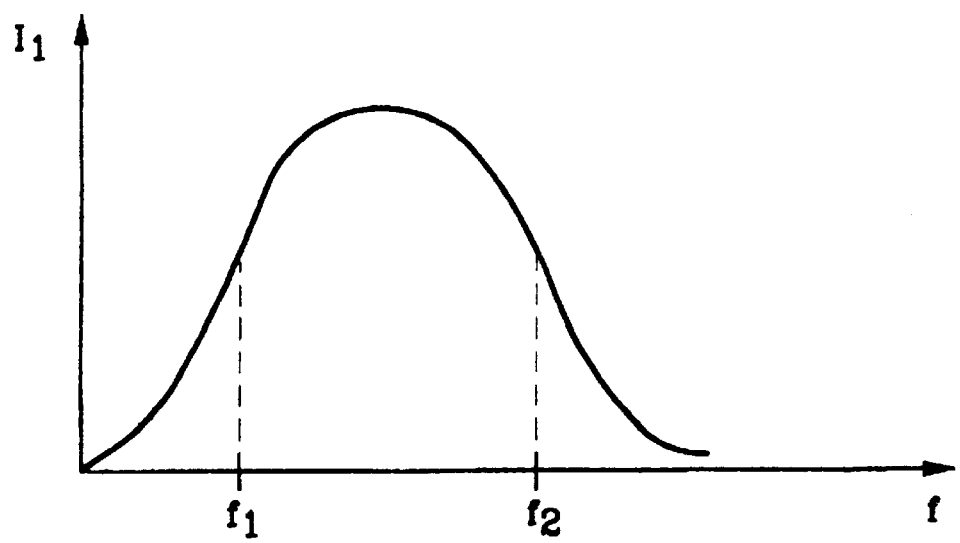
FIG. 4 is a graph of the relationship between the control current I1 of FIG. 3A and frequency.

FIG. 4 is a graph of the relationship between the control current I1 of FIG. 3A and the scanning frequency. As shown, the I1-frequency relationship is that of a band pass filter, with f1 being the lowest frequency in a typical multi-scanning range, and f2 being the highest frequency in a typical multi-scanning range. In one embodiment, f1 is 30 kHz and f2 is 120 kHz. As shown, whenever the scanning frequency in a multi-scanning monitor changes, I1 can be kept constant by the action of amplifier 300.

The vertical deflection block 234 adds the amplified $V_{PIN}$ signal, i.e., I1 to the vertical output signal Vr, to provide a vertical deflection signal (V-DY) that is corrected and/or adjusted and is constant over the scanning frequency ranges of the multi-scanning monitor 250.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. An image correction circuit for a multi-frequency display system, comprising:
   a first circuit that generates a first signal based on a correction signal derived from correction data, on a horizontal synchronization signal, and on a vertical synchronization signal;
   a deflection circuit that generates a deflection signal based on the first signal and the vertical synchronization signal, the deflection circuit being operable within a range of frequencies; and
   a video processing circuit coupled to said deflection circuit, that receives a video input signal and the deflection signal, the video processing circuit generating an output video signal based on the deflection signal and the video input signal.

2. The circuit of claim 1, further comprising a horizontal deflection circuit that generates a horizontal deflection signal based on the horizontal synchronization signal, wherein the deflection signal is a vertical deflection signal and wherein the video processing circuit further receives the horizontal deflection signal, the video processing circuit generating the output video signal based on the video input signal, the horizontal deflection signal and the vertical deflection signal.

3. The circuit of claim 2, wherein the video processing circuit is coupled to a display for display the output video signal.

4. The circuit of claim 1, wherein the deflection signal has a frequency that corresponds to a frequency of the correction signal.

5. A method for providing image distortion correction for a multi-frequency display system, comprising:

generating a first signal based on a correction signal derived from correction data, on a horizontal synchronization signal, and on a vertical synchronization signal;

generating a deflection signal based on the first signal and the vertical synchronization signal, the deflection signal being operable within a frequency range;

receiving a video input signal and the deflection signal; and generating an output video signal based on the deflection signal and the video input signal.

6. The method of claim 5, wherein the deflection signal is a vertical deflection signal, the method further comprising:

generating a horizontal deflection signal based on the horizontal synchronization signal; and generating the output video signal based on the deflection signal, the video input signal and the horizontal deflection signal.

7. The method of claim 6, further comprising displaying the output video signal on a display.

8. An image correction apparatus for a multi-frequency display system, comprising:

a horizontal deflection circuit that generates a horizontal deflection signal based on a horizontal synchronization signal;

a circuit that generates a first signal based on a correction signal derived from correction data, on the horizontal synchronization signal, and on a vertical synchronization signal;

a vertical deflection circuit that generates a vertical deflection signal based on the first signal and the vertical synchronization signal, the vertical deflection circuit being operable within a range of frequencies; and a display coupled to receive a video input signal, the horizontal deflection signal and the vertical deflection signal, the display generating an output video signal based on the video input signal, the horizontal deflection signal and the vertical deflection signal.

9. An image correction circuit for a multi-frequency display system, comprising:

a first circuit connected to receive a correction signal, a horizontal synchronization signal and a vertical synchronization signal, said first circuit generating a first signal based upon the correction signal, horizontal synchronization signal and vertical synchronization signal;

a deflection circuit that generates a deflection signal based on the first signal and the vertical synchronization signal, the deflection circuit being operable within a range of frequencies; and a video processing circuit coupled to said deflection circuit, that receives a video input signal and the deflection signal, the video processing circuit generating an output video signal based on the deflection signal and the video input signal.

10. A method for providing image distortion correction for a multi-frequency display system, comprising:

receiving a correction signal, a horizontal synchronization signal and a vertical synchronization signal;

generating a first signal based on the correction signal, the horizontal synchronization signal, and the vertical synchronization signal;

generating a deflection signal based on the first signal and the vertical synchronization signal, the deflection signal being operable within a frequency range;

receiving a video input signal and the deflection signal; and generating an output video signal based on the deflection signal and the video input signal.

11. The method of claim 10, wherein the deflection signal is a vertical deflection signal, the method further comprising:

generating a horizontal deflection signal based on the horizontal synchronization signal; and generating the output video signal based on the deflection signal, the video input signal and the horizontal deflection signal.

12. The method of claim 11, further comprising displaying the output video signal on a display.

13. The method of claim 10, wherein generating the deflection signal comprises:

amplifying the vertical synchronization signal;

generating a second signal based on the first signal;

filtering the second signal;

adding the filtered second signal to the vertical synchronization signal to provide an output signal.

14. An image correction apparatus for a multi-frequency display system, comprising:

a horizontal deflection circuit that generates a horizontal deflection signal and a vertical deflection signal;

a circuit connected to receive a correction signal, a horizontal synchronization signal and a vertical synchronization signal, said circuit generating a first signal based upon the correction signal, horizontal synchronization signal and vertical synchronization signal;

a vertical deflection circuit that generates a vertical deflection signal based on the first signal and the vertical synchronization signal, the vertical deflection circuit being operable within a range of frequencies; and a display coupled to receive a video input signal, the horizontal deflection signal and the vertical deflection signal, the display generating an output video signal based on the video input signal, the horizontal deflection signal and the vertical deflection signal.

15. The image correction apparatus of claim 14, wherein the vertical deflection circuit comprises:

an amplifier circuit having one input coupled to receive the vertical synchronization signal;

an output circuit having a vertical deflector and a filter coupled in series with the vertical deflector, the output circuit being coupled at a first end to an output of the amplifier circuit, the output circuit providing the output signal at a second end of the output circuit.

16. The image correction apparatus of claim 15, wherein the filter is a high frequency filter.

* * * * *